May 17, 1949. P. S. WEBB ET AL 2,470,593
HARDENED SILICONE SURFACED COOKING IMPLEMENT
Filed March 17, 1947
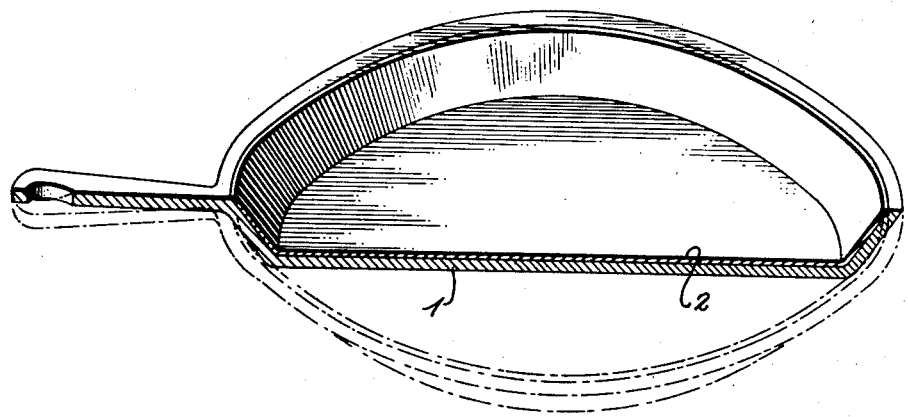
INVENTORS
Paul S. Webb and
John R. Koster
BY John Ewbank
ATTORNEY Patented May 17, 1949

2,470,593

UNITED STATES PATENT OFFICE 2,470,593

HARDENED SILICONE SURFACED COOKING IMPLEMENT

Paul S. Webb and John R. Koster, Boulder City, Nev., assignors to Processed Surfaces, Inc., New York, N. Y., a corporation of New York Application March 17, 1947, Serial No. 735,258

1 Claim. (Cl. 220—64)

Our invention relates to a new and improved cooking implement and to the method of preparing said cooking implements.

Reference is made to a patent application, Serial Number 19,353, filed April 6, 1948, as a continuation-in-part of the present application, which issued as Patent Number 2,462,242 on February 22, 1949.

This invention relates to metallic cooking implements characterized by a cooking surface of hardened silicone, as distinguished from the non-thermosetting silicones described in said co-pending application. Sauce pans and frying pans are suitable examples of metallic cooking implements.

It is among the objects of this invention to produce a cooking untensil which will remain at all times resistant to corrosion or staining and which may be very easily cleaned. Our new and improved cooking utensil can be made of such high heat conducting materials as aluminum or copper, and if treated in accordance with our invention will be highly resistant to corrosion and/or repellant to the adhesion of food stuffs or carbon in the event a cooking utensil is overheated.

As is well known, substantially all cooking utensils become highly discolored and stained with carbon or other chemicals on the bottom side when in contact with an open flame of a gas-burning stove. No effective method has heretofore been found for keeping the bottom of such pots and pans clean.

It is also among the objects and advantages of our invention to provide a cooking utensil which when treated in accordance with our invention will substantially prevent the discoloring or staining of the bottom of the cooking utensils exposed to direct or open flames.

In the use of some cooking implements, such as frying pans, pancake turners and spatulas, in frying eggs or pan cakes or the like, it is necessary to use considerable quantities of greases or fats to prevent the foodstuffs being cooked from sticking to the bottom of the pan or to the spatula or pan cake turners.

It is a further object of our invention to so prepare such cooking utensils and implements that the necessity for the use of fats, oils or greases is entirely eliminated. A further disadvantage of cooking utensils heretofore known lies in the disagreeable task of cleaning the utensils after they have been used. In substantially all cooking ware, except highly polished stainless steel, considerable amounts of energy must be expended in scrubbing the interior of the utensil in order to render it clean and sanitary.

It is a further object of our invention to produce a cooking utensil or implement which, if treated according to our invention, may be cleaned and returned to a bright and shiny condition by wiping it out with a damp cloth, or by treating it with a jet of live steam or in an autoclave sterilizer if more sterile conditions are required.

In the drawings, a cooking implement 1 is shown in a partially sectioned perspective view. The cooking implement 1 is illustrated to indicate a thin coating 2 of a hardened, non-viscous high molecular weight alkylated siloxy composition in which a substantial portion of the silicon atoms are attached to two carbon atoms. That is, the drawing shows the cooking implement 1 having a hardened silicone surface 2, as a coating on the metallic skillet.

In accordance with our invention, a cooking implement of any material is first cleaned in such a way that it is completely free of any contamination on its surface. We prefer treating newly manufactured cooking implements because there has been no opportunity for the burning or baking of carbon or other contaminating substances into the surface of the material. If the implement used is newly manufactured usually a wash with soap and water will be sufficient to prepare the surface. After the application of soap and water the cooking implement is then rinsed with distilled water and heated to drive off all moisture to make sure the surface is absolutely dry.

In the event it is felt the surface is contaminated with substances which will not be removed by ordinary soap and water, a very effective method of cleaning such surface is as follows: In the case of stainless steel, we have found it highly satisfactory to clean the surface with an alkali rinse and then pickle in a solution of nitric acid and hydrofluoric acid containing approximately 10% nitric acid and 2% hydrofluoric by volume. After the surface has been pickled in the solution, it is rinsed with distilled water and dried. The drying operation may be accomplished either by baking or by a blast of hot air. In the case of aluminum we have found a pickling solution containing approximately 2% hydrofluoric acid highly effective, and one which will leave a relatively bright surface after its application. The implement is then rinsed with distilled water and dried.

The cleaned surface is then treated or coated with a thin layer or application of an organo-silicon compound. The organo-silicon compounds, commonly known as "silicones" are obtained by the linking of silicon atoms to the carbon atoms of alkyl or aryl silicon hydroxy compounds. These latter are capable of condensation with loss of water to complex polymers of great stability and will not break down under temperatures which are extreme for cooking purposes.

A satisfactory type of water white silicone oil is methyl silicone. It possesses the advantages for this use of a low volatility and a negligible vapor pressure. It has a high resistance to oxidation, mineral acids and corrosive salt solutions. It is insoluble in water and the lower aliphatic alcohols. It is soluble in most organic solvents.

If it is desired to obtain a harder film of methyl silicone, it can be polymerized by heating to from 212° F. to 392° F. (100° C. to 200° C.) in accordance with the teachings of United States Letters Patent No. 2,258,218, which more specifically sets forth the properties and method of preparation of certain varieties of heat hardenable resinous methyl silicone.

Silicones of radicals other than methyl may be used such as, for example, the phenyl radical. Blends of silicones have been found satisfactory when it is desirable to vary the viscosity to facilitate application to the implement.

It is believed that the silicone seals the pores of the metal surfaces so that carbon or other contaminating substances cannot enter the pores and, therefore, will not stick or adhere to the metallic surface. In any event a strong adhesive bond exists between the silicone and the metallic surface which renders the surface highly hydrophobic.

The silicone may be applied to the cleaned surface of the implement in any suitable or desired manner, such as spraying, dipping or brushing. It will readily be understood by those skilled in the art that the viscosity of the silicone being used will determine the method of application, and it is well known that the viscosity may be altered at will by use of some of the hydrocarbon solvents. The choice of the hydrocarbon solvent will depend in a large degree upon its relative cost and volatility.

A further method of applying a silicone surface to the cooking implement, which has been found satisfactory, is as follows: After the implement has been cleaned and rinsed, it is placed in a cabinet in a damp condition in the presence of a fuming chlorosilicane. The chlorosilicane upon contacting the moisture on the surface of the implement liberates the hydrochloric acid and deposits a silicone finish on the implement.

It is to be understood that both the inside and outside of cooking implements should be treated in accordance with this invention so that not only will the need for greases, oils and fats be eliminated but also the underside of the utensil in contact with open flames will be protected from staining and corrosion.

The coating applied in accordance with the teachings of our invention is exceedingly thin and not visible to the naked eye. It is believed that the coating approaches a monomolecular film.

Having described our invention, what we claim as new and desire to secure by Letters Patent is:

A metallic cooking implement having a cooking surface consisting of a thin coating of a hardened, non-viscous, high molecular weight alkylated siloxy composition in which a substantial portion of the silicon atoms are attached to two carbon atoms, said coating providing a surface very easily cleaned so long as said coating remains continuously adherent to the metal.

PAUL S. WEBB.
JOHN R. KOSTER.

REFERENCES CITED

The following references are of record in the file of this patent:

UNITED STATES PATENTS

| Number | Name | Date |
|---|---|---|
| 1,699,843 | Herting | Jan. 22, 1929 |
| 1,970,723 | Wolfe | Aug. 21, 1934 |
| 2,034,057 | Reuss | Mar. 17, 1936 |
| 2,050,061 | McCaskell | Aug. 4, 1936 |
| 2,258,218 | Rochow | Oct. 7, 1941 |

FOREIGN PATENTS

| Number | Country | Date |
|---|---|---|
| 436,229 | Great Britain | Oct. 7, 1935 |